(12) United States Patent
Cody

(10) Patent No.: US 10,147,170 B2
(45) Date of Patent: Dec. 4, 2018

(54) SYSTEMS AND METHODS FOR SHARPENING MULTI-SPECTRAL IMAGERY

(71) Applicant: Raytheon Company, Waltham, MA (US)

(72) Inventor: Mac Allen Cody, Richardson, TX (US)

(73) Assignee: Raytheon Company, Waltham, MA (US)

( * ) Notice: Subject to any disclaimer, the term of this patent is extended or adjusted under 35 U.S.C. 154(b) by 203 days.

(21) Appl. No.: 15/190,649

(22) Filed: Jun. 23, 2016

(65) Prior Publication Data

US 2017/0084008 A1 Mar. 23, 2017

Related U.S. Application Data

(60) Provisional application No. 62/219,729, filed on Sep. 17, 2015.

(51) Int. Cl.
  *G06T 5/00* (2006.01)
  *H04N 1/60* (2006.01)
  *H04N 1/409* (2006.01)
  *G06T 5/50* (2006.01)

(52) U.S. Cl.
  CPC .............. *G06T 5/003* (2013.01); *G06T 5/50* (2013.01); *H04N 1/4092* (2013.01); *H04N 1/6008* (2013.01); *G06T 2207/10036* (2013.01); *H04N 2201/0089* (2013.01)

(58) Field of Classification Search
  CPC . G06T 2207/10024; G06T 2207/30232; G06T 5/003; G06T 3/4007; G06T 3/4084; H04N 1/6008; H04N 2201/0089; H04N 1/4092
  See application file for complete search history.

(56) References Cited

U.S. PATENT DOCUMENTS

| 6,480,139 B1 * | 11/2002 | Hoctor | G01S 7/36 |
| | | | 342/13 |
| 2010/0008598 A1 * | 1/2010 | Riley | G06K 9/0063 |
| | | | 382/299 |

OTHER PUBLICATIONS

Amro, Israa, "A survey of classical methods and new trends in pansharpening of multispectral images", EURASIP Journal on Advances in Signal Processing, 79, (2011), 1-22.
Olver, Peter, "Sections 5.2 and 5.3 (from Chapter 5)", Applied Mathematics, (2004), 155-163.
Blomgren, Peter, "Numerical Matrix Analysis, Lecture Notes #07— The QR-Factorization and Least Squares Problems: Gram-Schmidt and Householder", Dynamical Systems Group, Computational Sciences Center, San Diego State University, (2014), 38 pgs.

* cited by examiner

*Primary Examiner* — Abderrahim Merouan
(74) *Attorney, Agent, or Firm* — Schwegman Lundberg & Woessner, P.A.

(57) ABSTRACT

Discussed herein are apparatuses, systems, and methods for sharpening multi-spectral image data using panchromatic image data. A method can include using a Householder transform in such sharpening.

20 Claims, 5 Drawing Sheets

SYSTEMS AND METHODS FOR SHARPENING MULTI-SPECTRAL IMAGERY

RELATED APPLICATION

This application claims the benefit of priority to provisional patent application No. 62/219,729, filed on Sep. 17, 2015, titled "SYSTEMS AND METHODS FOR SHARPENING MULTI-SPECTRAL IMAGERY", which is incorporated by reference herein in its entirety.

TECHNICAL FIELD

One or more embodiments discussed herein generally relate to sharpening a multi-spectral (MS) image. Some embodiments relate more specifically to using a panchromatic (PAN) image that includes at least a portion of the scene depicted in the MS image to sharpen the MS image.

BACKGROUND

An MS image conveys image data at specific ranges of frequencies of the electromagnetic spectrum. An MS image can be created using multiple detectors that are sensitive to only portions of the EM spectrum and combining the data received at each of the multiple detectors to create a color image. A PAN image is an image that includes only a single band of frequencies (usually displayed as shades of gray) as opposed to the multiple bands of frequencies used in an MS image. The PAN image typically includes a higher spatial resolution than an MS image.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to sharpening a multi-spectral (MS) image. Some embodiments relate more specifically to using a panchromatic (PAN) image that includes at least a portion of the scene depicted in the MS image to sharpen the MS image.

Gram-Schmidt (G-S) PAN Sharpening (PS) is a process for increasing the spatial resolution of MS imagery to that of co-registered PAN imagery. Householder PAN Sharpening (HPS) provides results that are similar to G-SPS for MS images with a small number of bands. HPS provides numerical stability in finite precision math, which G-SPS does not provide. This allows HPS to be used for sharpening imagery with a large number of image bands, such as superspectral and hyperspectral imagery. Thus, in contrast to G-SPS HPS also provides correct results for MS images with a large number of bands, greater than twenty, twenty-four, or more bands (e.g., superspectral or hyperspectral imagery) due to greatly improved numerical stability of HPS.

PAN (panchromatic) sharpening of an MS image increases the spatial resolution of the MS image to that of a co-registered PAN image. A co-registered PAN image is a gray scale image of a geo-location that is also depicted in the MS image. G-SPS is a tool for analyst in the intelligence community (IC) due to its availability in ENVI®, which is commonly used by the IC and produced by Exelis Geospatial Systems of Rochester, N.Y., United States, which is currently a subsidiary of Harris Corporation of Melbourne, Fla. United States.

There are a variety of types of PS tools that operate on a variety of different principles. These principles include component substitution (e.g., intensity hue saturation (IHS), principal component substitution (PCS), and G-SPS), relative spectral contribution (e.g., Brovey transform (BT) and intensity modulation (IM), high-frequency injection (e.g., high pass filtering (HPF) and high pass modulation (HPM)), image statistics methods (e.g., price method, spatially adapted methods, Bayesian-based methods, and super-resolution methods), and multiresolution (e.g., generalized Laplacian pyramid (GLP), wavelet methods, and counterlet methods). Embodiments discussed herein regard a component substitution method of performing PS.

Figure 1:
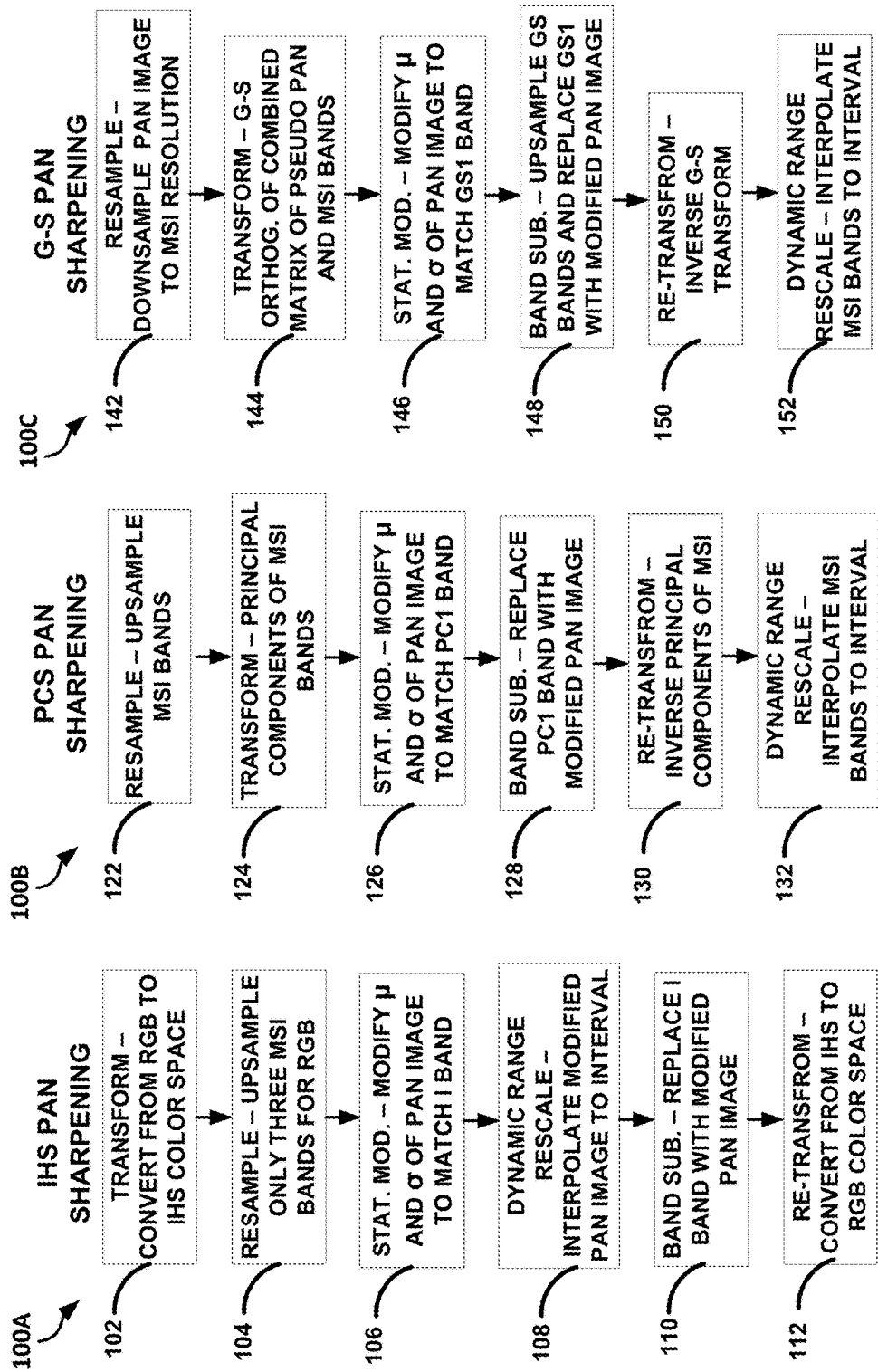
FIG. 1A illustrates a flow diagram of a general IHS PS process at a high level.
FIG. 1B illustrates a flow diagram of a general PCS PS process at a high level.
FIG. 1C illustrates a flow diagram of a general G-S PS process at a high level.

FIG. 1A illustrates a flow diagram describing a general IHS PS process 100A at a high level. Generally, an IHS process recasts three bands (e.g., Red. Green and Blue (RGB)) as intensity, hue, and saturation and, after upsampling, a PAN band replaces the intensity band before conversion back to RGB. The IHS PS process as illustrated includes the operations of transforming (operation 102), resampling (operation 104), statistical modification (operation 106), dynamic range rescale (operation 108), band substitution (operation 110), and re-transforming (operation 112, sometimes referred to as inverse transforming).

The operation 102 as illustrated includes converting RGB image data from an MS image to IHS color space. The operation 104 as illustrated includes upsampling only three MSI bands for RGB. The operation 106 as illustrated includes modifying a mean and stand deviation of a PAN image to match an intensity band of the IHS color space bands. The operation 108 as illustrated includes interpolating the modified PAN image to an interval (e.g., [0, 1]). The operation 110 as illustrated includes replacing the intensity band with the modified PAN image band. The operation 112 as illustrated includes converting from IHS color space back to RGB color space, such as by performing the inverse transform of the transform of operation 102.

FIG. 1B illustrates a flow diagram describing a general PCS PS process 100B at a high level. Generally, a PCS process orthogonalizes upsampled bands and a PAN band replaces a principal component (representing intensity) before an inverse PC transform is performed to produce the sharpened MS image. Upsampling of lower resolution (lower than the PAN image) MS bands occurs prior to the inverse PCS transform. The PCS PS process 100B as illustrated includes the operations of resampling (operation 122), transforming (operation 124), statistical modification (operation 126), band substitution (operation 128), re-transforming (operation 130), and dynamic range rescale (operation 132).

The operation 122 as illustrated includes upsampling MSI bands. The operation 124 as illustrated includes transforming principal components of MSI bands. The operation 126 as illustrated includes modifying a mean and stand deviation of a PAN image to match PCI band. The operation 128 as illustrated includes replacing a PCI band with the modified PAN image band. The operation 130 as illustrated includes performing inverse transformation of operation 124. The operation 132 as illustrated includes interpolating the modified PAN image to an interval (e.g., [0, 1]).

FIG. 1C illustrates a flow diagram describing a general G-S PS process 100C at a high level. Generally, a G-S process creates a QR decomposition (an orthogonal matrix Q and an upper triangular matrix R) of the MS image bands. Upsampling of lower resolution bands of the MS image occurs after performing a G-S transform on the bands. Thus, upsampling occurs prior to the transformation in IHS and PCS processes and after the transformation in a G-S process. The G-S PS process 100C as illustrated includes the operations of resampling (operation 142), transforming (operation 144), statistical modification (operation 146), band substitution (operation 148), re-transforming (operation 150), and dynamic range rescale (operation 152).

The operation 142 as illustrated includes downsampling PAN image band to MSI resolution. The operation 144 as illustrated includes performing G-S orthogonalization of combined matrix of pseudo PAN and MSI bands. The operation 146 as illustrated includes modifying a mean and stand deviation of a PAN image to match GS1 band. The operation 148 as illustrated includes replacing GS1 band with the modified (downsampled) PAN image band. The operation 150 as illustrated includes performing inverse transformation of operation 144. The operation 152 as illustrated includes interpolating the modified MSI image to an interval (e.g., [0, 1]).

A quick review of a QR decomposition is now presented. QR decomposition restates an m×n orthogonal matrix Q and an n×n upper triangular matrix R, A=QR. The columns in Q form vectors that are orthogonal to each other and form an orthogonal basis. Representing individual elements A, Q, R yields the following form (where each column element in A and Q is an m×1 vector:

$$|a1 \ a2 \ a3 \ a4 \ a5| = |q1 \ q2 \ q3 \ q4 \ q5| \times \begin{vmatrix} r11 & r12 & r13 & r14 & r15 \\ 0 & r22 & r23 & r24 & r25 \\ 0 & 0 & r33 & r34 & r35 \\ 0 & 0 & 0 & r44 & r45 \\ 0 & 0 & 0 & 0 & r55 \end{vmatrix}$$

There are several methods for performing a QR decomposition, such as G-S orthogonalization, Householder QR method, and Givens method, for example. The G-S orthogonalization technique is subject to numerical instability, which results in loss of orthogonality when performed using finite-precision mathematics. Thus, G-S will not be extendable to imagery with a larger number of bands (e.g., greater than twenty bands). Numerical results for classical G-S (CGS) and modified G-S (MGS) deviate for dimension, n greater than two.

Figure 2:
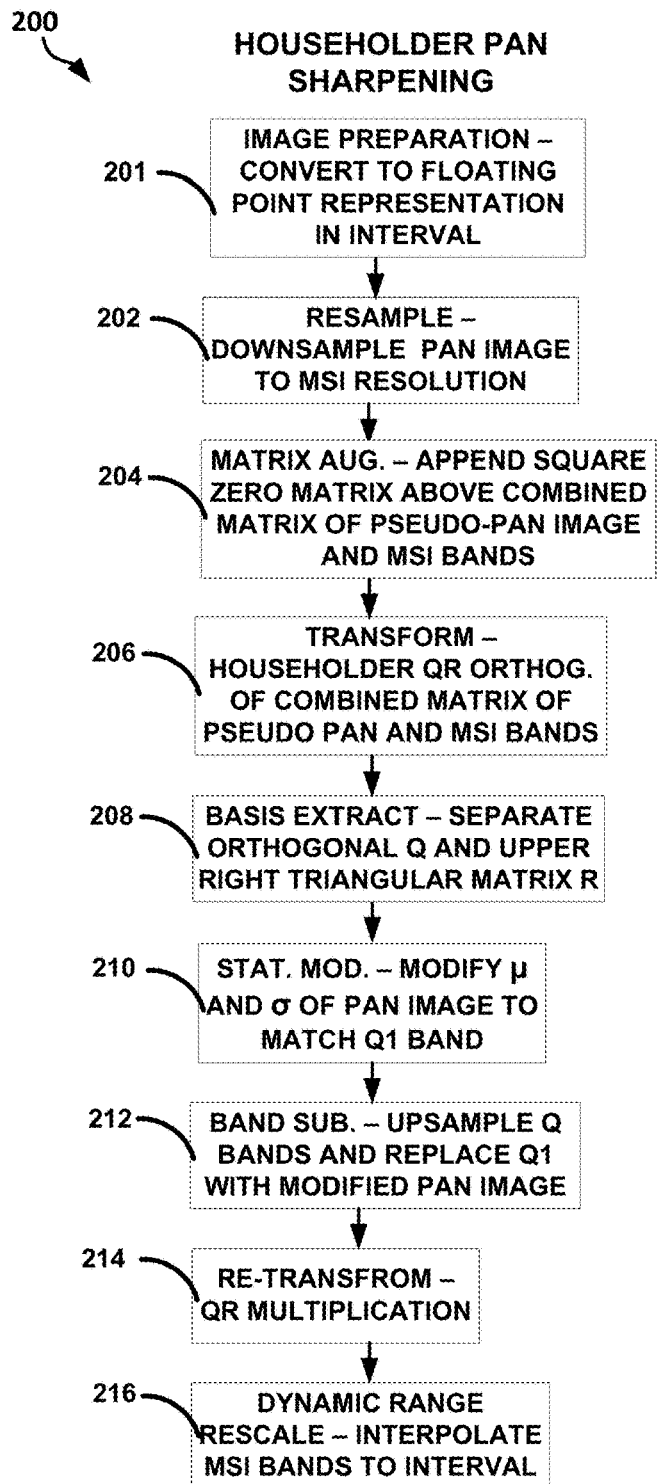
FIG. 2 illustrates, by way of example, a flow diagram of an embodiment of a Householder PAN sharpening process, in accord with one or more embodiments.

FIG. 2 illustrates, by way of example, a flowchart of an embodiment of a method 200 for sharpening an MS image using a PAN image. The Householder PS process 200 as illustrated includes the operations of (optionally) preparing the image(s) (operation 201), resampling (operation 202), matrix augmentation (operation 104), transforming (operation 106), basis extraction (operation 208), statistical modification (operation 210), band substitution (operation 212), re-transforming (operation 214), and dynamic range rescale (operation 216).

The operation 201 as illustrated includes converting the image data of the MSI and/or PAN image from an integer representation to a floating point representation in an interval (e.g., [0, 1]).

Using a component substitution PS process, the image data can be first converted from integer representation to floating-point representation. Such as conversion can include a rescale and/or changing the dynamic range of the image data to the interval [0, 1]. The numerical normalization process can maximize the bias removed from the imager data values. The normalization process can expand the remaining image content over the full dynamic range. One such normalization is described with regard to Equation (Eq.) 1:

$$X_{norm} = \frac{X - \min(X)}{\max(X) - \min(X)} \quad \text{Eq. 1}$$

Where $X_{norm}$ is the normalized version of the pixel value X in the image data, min(X) is the smallest pixel value of all pixel values in the image data, and max(X) is the largest pixel value of all pixel values in the image data.

The operation 202 as illustrated includes down-sampling PAN image band data to MS image resolution (or creating a pseudo-PAN image from the MS image). The result of performing the operation is creation of a pseudo-PAN image. The pseudo-PAN image can be used in conjunction with the MSI to provide a so called "intensity band" in component substitution. For Householder PS to operate properly, a version of the PAN image should include nearly a same resolution and a same dimension of the MSI. Hence, the pseudo-PAN image is sometimes referred to as a low-resolution PAN image (a PAN image of lower resolution than the original or a usual PAN image). There are several ways this image can made available. One way is to provide a separate PAN image that was collected with the same resolution as the multispectral image. This is not common, as a usual sensor compliment is to have a moderate-resolution MSI with a co-collected high-resolution PAN image. Another way includes generating the pseudo-PAN image can by rescaling the high-resolution PAN image to the same resolution as the MSI. This can be performed using 'nearest neighbor' selection, if the ratio s of the two resolutions is integer, as shown in Eq. 2:

$$\tilde{p}_i = p_{s*i} \quad \text{Eq. 2}$$

Alternatively, an interpolation can be performed. Yet another way includes generating the pseudo-PAN image by combining the pixels of each band of the multispectral image. The pixels of each band $b_i$ can be weighed according to some desired spectral response function $w_i$, as shown in Eq. 3:

$$\tilde{p}_{m,n} = \sum_{i=1}^{j} b_{m,n,i} w_i \qquad \text{Eq. 3}$$

Where m and n are the rows and columns of the multispectral and resulting pseudo-PAN image. Note that the pseudo-PAN image can be normalized, as described with regard to operation 201.

The operation 204 as illustrated includes appending a square zero matrix above a combined matrix of down-sampled (or pseudo-PAN) image and MS image bands to create a combined matrix. The image data can be converted into a matrix representation with two dimensions. This can accomplished by first columnarizing the pseudo-PAN image from an m×n image raster to a mn×1 column matrix and subtracting off the mean of the pseudo-PAN pixel data $\mu_{\tilde{p}}$, as shown in Eq. 4. This column matrix forms a submatrix that will be the first column of matrix A.

$$\begin{bmatrix} \tilde{p}_{1,1} & \tilde{p}_{1,2} & \cdots & \tilde{p}_{1,n} \\ \tilde{p}_{2,1} & \tilde{p}_{2,2} & \cdots & \tilde{p}_{2,n} \\ \vdots & \vdots & \ddots & \vdots \\ \tilde{p}_{m,1} & \tilde{p}_{m,2} & \cdots & \tilde{p}_{m,n} \end{bmatrix} \Rightarrow \begin{bmatrix} \tilde{p}_{1,1} - \mu_{\tilde{p}} \\ \tilde{p}_{2,1} - \mu_{\tilde{p}} \\ \vdots \\ \tilde{p}_{m,1} - \mu_{\tilde{p}} \\ \tilde{p}_{1,2} - \mu_{\tilde{p}} \\ \tilde{p}_{2,2} - \mu_{\tilde{p}} \\ \vdots \\ \tilde{p}_{m,2} - \mu_{\tilde{p}} \\ \vdots \\ \tilde{p}_{1,n} - \mu_{\tilde{p}} \\ \tilde{p}_{2,n} - \mu_{\tilde{p}} \\ \vdots \\ \tilde{p}_{m,n} - \mu_{\tilde{p}} \end{bmatrix} = \begin{bmatrix} \alpha_{1,1} \\ \alpha_{2,1} \\ \vdots \\ \alpha_{mn,1} \end{bmatrix} \qquad \text{Eq. 4}$$

The same operation can be done for each band of the multispectral image, as shown in Eq. 5Eq. Each column matrix formed can constitute subsequent submatrices of the matrix A.

$$\begin{bmatrix} b_{11,i} & b_{12,i} & \cdots & b_{1n,i} \\ b_{21,i} & b_{22,i} & \cdots & b_{2n,i} \\ \vdots & \vdots & \ddots & \vdots \\ b_{m1,i} & b_{m2,i} & \cdots & b_{mn,i} \end{bmatrix} \Rightarrow \begin{bmatrix} b_{11,i} - \mu_{b_i} \\ b_{21,i} - \mu_{b_i} \\ \vdots \\ b_{m1,i} - \mu_{b_i} \\ b_{12,i} - \mu_{b_i} \\ b_{22,i} - \mu_{b_i} \\ \vdots \\ b_{m2,i} - \mu_{b_i} \\ \vdots \\ b_{1n,i} - \mu_{b_i} \\ b_{2n,i} - \mu_{b_i} \\ \vdots \\ b_{mn,i} - \mu_{b_i} \end{bmatrix} = \begin{bmatrix} a_{1,l} \\ a_{2,l} \\ \vdots \\ a_{mn,l} \end{bmatrix}, \begin{array}{l} i = 1, \ldots, j \\ l = 2, \ldots, k \end{array} \qquad \text{Eq. 5}$$

Finally, the columnar matrices are combined to form A, an mn×k matrix, consisting of the columnarized pseudo-PAN image as the first column followed by the j columnarized bands of the multispectral image, as shown in Eq. 6:

$$A_{mn \times k} = \begin{bmatrix} a_{1,1} & a_{1,2} & \cdots & a_{1,k} \\ a_{2,1} & a_{2,2} & \cdots & a_{1,k} \\ \vdots & \vdots & \ddots & \vdots \\ a_{mn,1} & a_{mn,2} & \cdots & a_{mn,k} \end{bmatrix} \qquad \text{Eq. 6}$$

The matrix A can be augmented with a k×k matrix of zeros to form Â, an mn+k×k matrix, as shown in Eq. 1.

$$\tilde{A}_{mn+k \times n} = \begin{bmatrix} 0 \\ A \end{bmatrix} = \begin{bmatrix} 0 & 0 & \cdots & 0 \\ 0 & 0 & \cdots & 0 \\ \vdots & \vdots & \ddots & \vdots \\ 0 & 0 & \cdots & 0 \\ a_{1,1} & a_{1,2} & \cdots & p_{1,k} \\ a_{2,1} & a_{2,2} & \cdots & p_{1,k} \\ \vdots & \vdots & \ddots & \vdots \\ a_{mn,1} & a_{mn,2} & \cdots & p_{mn,k} \end{bmatrix} \qquad \text{Eq. 1}$$

The operation 206 as illustrated includes performing a Householder transformation that includes Householder orthogonalization of the combined matrix. The Householder transformation can include multiplying the matrix A by partial Q matrices $Q_n$ to obtain matrix R, as shown in Eq. 8:

$$Q_n Q_{n-1} \cdots Q_2 Q_1 A = R \qquad \text{Eq. 8}$$

The design of each matrix $Q_k$ can be such that it operates on rows k:m of A and not change the first k−1 rows of the matrix A. Thus, each matrix $Q_k$ can take the form shown in Eq. 9:

$$Q_k = \begin{bmatrix} I_{k-1} & 0 \\ 0 & F \end{bmatrix} \qquad \text{Eq. 9}$$

Where I is the identity matrix and F is a Householder reflector, which can effect the mapping shown in Eq. 10:

$$x = \begin{bmatrix} X \\ X \\ X \\ \vdots \\ X \end{bmatrix} \xrightarrow{F} Fx = \begin{bmatrix} \|x\| \\ 0 \\ 0 \\ \vdots \\ 0 \end{bmatrix} = \|x\| e_1 \qquad \text{Eq. 10}$$

where x consists of entries k through m for the kth column vector in the matrix A and corresponds to iteration k. For the Householder reflector to properly reflect x across the hyperplane H, so that x maps to $\|x\| e_1$, the vector to project x onto H can be applied twice, as shown in Eq. 11:

$$F = I - 2\frac{vv^T}{v^T v} \Rightarrow I - 2vv^T \qquad \text{Eq. 2}$$

There are two possible directions that the orthogonal vector $v_k$ can take to reflect x across two orthogonal hyperplanes $H^+$ and $H^-$. To obtain the goal of numerical stability, the reflection of x should be as far away as possible. The calculation of v can account for the sign of the first component of x as shown in Eq.

$$v=\text{sign}(x_1)\|x\|e_1+x \qquad \text{Eq. 12}$$

The Householder QR algorithm can then take the form, as presented in Eq. 13:

for $k=1$ to $n$ $$x=A_{k:m,k}$$

$$v_k=\text{sign}(x)\|x\|_2 e_1+x$$

$$v_k=v_k/\|v_k\|_2$$

$$A_{k:m,k:n}=A_{k:m,k:n}-2v_k(v_k{}^*A_{k:m,k:n}) \qquad \text{Eq. 13}$$

Due to the reflection technique described above, Householder QR is more stable than MGS. It can be demonstrated that Householder QR is more numerically stable that MGS in practice and mathematically equivalent to MGS. Householder QR, as opposed to MGS, shows no loss of orthogonality and is also not subject to loss of orthogonality due to rank deficiency in A.

The Householder QR transform, described with regard to operation 206, is applied to the augmented matrix A discussed with regard to operation 204. Two matrices are created by the transform performed using operation 206. The matrix V is a composite of the Householder vectors. Q, and the upper triangle of the residual matrix, R. The matrix $$V=\begin{bmatrix} -E \\ Q \end{bmatrix},$$

where $-E$ consists of the first k rows of V and Q consists of the remaining mn rows of V. The matrix D is the diagonal of the residual matrix, R. These matrices are shown in Eq. 14:

$$V=\begin{bmatrix} -E \\ Q \end{bmatrix}=\begin{bmatrix} 1 & -e_{1,2} & -e_{1,3} & \cdots & -e_{1,k-1} & -e_{1,k} \\ 0 & 1 & -e_{2,3} & \cdots & -e_{2,k-1} & -e_{2,k} \\ 0 & 0 & 1 & \cdots & -e_{3,k-1} & -e_{3,k} \\ \vdots & \vdots & \vdots & \ddots & \vdots & \vdots \\ 0 & 0 & 0 & \cdots & 1 & -e_{k-1,k} \\ 0 & 0 & 0 & \cdots & 0 & 1 \\ q_{1,1} & q_{1,2} & q_{1,3} & \cdots & q_{1,k-1} & q_{1,k} \\ q_{2,1} & q_{2,2} & q_{2,3} & \cdots & q_{2,k-1} & q_{2,k} \\ \vdots & \vdots & \vdots & \ddots & \vdots & \vdots \\ q_{mn,1} & q_{mn,2} & q_{mn,2} & \cdots & q_{mn,k-1} & q_{mn,k} \end{bmatrix} \qquad \text{Eq. 14}$$

$$D=\begin{bmatrix} d_{1,1} \\ d_{2,1} \\ d_{3,1} \\ \vdots \\ d_{k,1} \end{bmatrix}$$

The operation 208 as illustrated includes extracting a basis by separating an orthogonal matrix Q and an upper right triangular matrix, R, from the matrices V and D. The Q and $-E$ matrices can be extracted from V, and the $-E$ and D matrices can combined to form R. This can be accomplished by first adding $-E$ to a k×k identity matrix I followed by subtracting the diagonalization of D, as shown in Eq. 15:

$$R=I+E-\text{diag}(D)) \qquad \text{Eq. 15}$$

The resulting residual matrix, R, is upper triangular, as shown in Eq. 16:

$$R=\begin{bmatrix} r_{1,1} & r_{1,2} & r_{1,3} & \cdots & r_{1,k} \\ 0 & r_{2,1} & r_{2,3} & \cdots & r_{2,k} \\ 0 & 0 & r_{3,1} & \cdots & r_{3,k} \\ \vdots & \vdots & \vdots & \ddots & \vdots \\ 0 & 0 & 0 & \cdots & r_{k,k} \end{bmatrix}= \qquad \text{Eq. 16}$$

$$\begin{bmatrix} -d_{1,1} & e_{1,2} & e_{1,3} & \cdots & e_{1,k} \\ 0 & -d_{2,1} & e_{2,3} & \cdots & e_{2,k} \\ 0 & 0 & -d_{3,1} & \cdots & e_{3,k} \\ \vdots & \vdots & \vdots & \ddots & \vdots \\ 0 & 0 & 0 & \cdots & -d_{k,1} \end{bmatrix}$$

The operation 210 as illustrated includes rescaling and modifying mean ($\mu$) and standard deviation ($\sigma$) of PAN image to match mean ($\mu$) and standard deviation ($\sigma$) of the $Q_1$ band, which is the first column of Q, also known as the basis vector $q_1$. The transformation of the combined pseudo-PAN and multispectral matrix performed in operation 208 yields a matrix Q, representing a set of orthogonal basis vectors. The first column represents the intensity basis vector $q_1$. Statistical modification alters the mean and standard deviation of the sm×sn high-resolution PAN image ($\mu_{PAN}$, $\sigma_{PAN}$) to match the mean and standard deviation of the intensity basis vector $q_1$ ($\mu_q$, $\sigma_q$). To accomplish this, each pixel value in the hi h-resolution PAN image can be modified according to Eq. 17.

$$\hat{p}=p\left(\frac{\sigma_{q_1}}{\sigma_{PAN}}\right)+\mu_{q_1}-\left(\frac{\sigma_{q_1}}{\sigma_{PAN}}\right)\mu_{PAN} \qquad \text{Eq. 17}$$

The operation 212 as illustrated includes upsampling Q bands and replacing $q_1$ band with modified PAN image band (downsampled and statistically modified PAN image data). After the statistics of the high-resolution PAN image have been modified at operation 210, matrix Q is up-sampled to the resolution of the high-resolution PAN image and the intensity basis vector $q_1$ is replaced with the modified high-resolution PAN image. To up-sample the matrix Q, each column vector of the matrix can be separated and reshaped so that the number of rows and columns match the number of lines and samples of m×n the multispectral image, as shown in Eq. 8. The number of lines is the number of rows in the image data and the number of samples is the number of pixels per row in the image data. Note that in practice, the first column does not need to be processed, as it will be discarded, in such as case there will be j reorder matrices, the same number as the number of bands in the multispectral image.

$$\begin{bmatrix} q_{1,1} & q_{1,2} & \cdots & q_{1,k} \\ q_{2,1} & q_{2,2} & \cdots & q_{2,k} \\ \vdots & \vdots & \ddots & \vdots \\ q_{m,1} & q_{m,2} & \cdots & q_{m,k} \\ q_{m+1,1} & q_{m+1,2} & \cdots & q_{m+1,k} \\ q_{m+2,1} & q_{m+2,2} & \cdots & q_{m+2,k} \\ \vdots & \vdots & \ddots & \vdots \\ q_{2m,1} & q_{2m,2} & \cdots & q_{2m,k} \\ \vdots & \vdots & \cdots & \vdots \\ q_{m(n-1)+1,1} & q_{m(n-1)+1,2} & \cdots & q_{m(n-1)+1,k} \\ q_{m(n-1)+2,1} & q_{m(n-1)+2,2} & \cdots & q_{m(n-1)+2,k} \\ \vdots & \vdots & \ddots & \vdots \\ q_{mn,1} & q_{mn,2} & \cdots & q_{mn,k} \end{bmatrix} \Rightarrow$$

Eq. 18

$$\begin{bmatrix} q_{1,1} & q_{m+1,1} & \cdots & q_{m(n-1)+1,1} \\ q_{2,1} & q_{m+2,1} & \cdots & q_{m(n-1)+2,1} \\ \vdots & \vdots & \ddots & \vdots \\ q_{m,1} & q_{2m,1} & \cdots & q_{mn,1} \end{bmatrix}$$

$$\begin{bmatrix} q_{1,2} & q_{m+1,2} & \cdots & q_{m(n-1)+1,2} \\ q_{2,2} & q_{m+2,2} & \cdots & q_{m(n-1)+2,2} \\ \vdots & \vdots & \ddots & \vdots \\ q_{m,2} & q_{2m,2} & \cdots & q_{mn,2} \end{bmatrix}$$

$$\vdots$$

$$\begin{bmatrix} q_{1,k} & q_{m+1,k} & \cdots & q_{m(n-1)+1,k} \\ q_{2,k} & q_{m+2,k} & \cdots & q_{m(n-1)+2,k} \\ \vdots & \vdots & \ddots & \vdots \\ q_{m,k} & q_{2m,k} & \cdots & q_{mn,k} \end{bmatrix}$$

Each reordered matrix can be interpolated to have the same number of rows and columns as the number of lines and samples in the high-resolution PAN image. To accomplish this, a bilinear interpolation can be performed as in Eq. 19:

$$\frac{1}{(y_{i+1} - y_i)(x_{j+1} - x_j)}$$

Eq. 19

$$(p_{i,j}(y_{i+1} - y)(x_{j+1} - x) + p_{i+1,j}(y - y_i)(x_{j+1} - x) + p_{i,j+1}(y_{i+1} - y)(x - x_j) + p_{i+1,j+1}(y - y_i)(x - x_j))$$

where $p_{i,j}$, $p_{i,j+1}$, $p_{i+1,j}$, and $p_{i+1,j+1}$ are the counts values for adjunct pixels for lines $y_i$ and $y_{i+1}$ and samples $x_j$ and $x_{j+1}$ with interpolation value calculation at line y and sample x. The position of each interpolated sample (x,y) is such that the interpolated mesh is evenly spaced according to a scale factor s.

Once the interpolation is completed, the modified high-resolution PAN image and the j submatrices (bands) are reordered back into $s^2mn \times 1$ columnar matrices and combined into a modified $s^2mn \times k$ matrix $\hat{Q}$, using the operation 204 and shown in Eq. 20. Note that no bias removal is performed in this illustrated case, but can be performed if needed or desired.

$$\begin{bmatrix} \hat{p}_{1,1} & q_{1,2} & \cdots & q_{1,k} \\ \hat{p}_{2,1} & q_{2,2} & \cdots & q_{2,k} \\ \vdots & \vdots & \ddots & \vdots \\ \hat{p}_{sm,1} & q_{sm,2} & \cdots & q_{m,k} \\ \hat{p}_{sm+1,1} & q_{sm+1,2} & \cdots & q_{m+1,k} \\ \hat{p}_{sm+2,1} & q_{sm+2,2} & \cdots & q_{m+2,k} \\ \vdots & \vdots & \ddots & \vdots \\ \hat{p}_{2sm,1} & q_{2sm,2} & \cdots & q_{2m,k} \\ \vdots & \vdots & \cdots & \vdots \\ \hat{p}_{sm(sn-1)+1,1} & q_{sm(sn-1)+1,2} & \cdots & q_{sm(sn-1)+1,k} \\ \hat{p}_{sm(sn-1)+2,1} & q_{sm(sn-1)+2,2} & \cdots & q_{sm(sn-1)+2,k} \\ \vdots & \vdots & \ddots & \vdots \\ \hat{p}_{s^2mn,1} & q_{s^2mn,2} & \cdots & q_{s^2mn,k} \end{bmatrix}$$

Eq. 4

The operation 214 as illustrated includes performing an inverse transform back to image space that has a resolution of the PAN image by performing QR multiplication. The $s^2mn \times k$ matrix Q, created using operation 212, can be re-transformed back into image space. This can be accomplished by multiplying the matrix by the k×k triangular residual matrix R, as shown in Eq. 21:

$$\hat{A} = \hat{Q}R$$

Eq. 21

The first column of the resulting $s^2mn \times k$ matrix $\hat{A}$ is discarded. The second through k-th columns can be reordered into sm×sn matrices, as shown in Eq. There can be j reorder matrices to perform such an operation, the same number as the number of bands in the multispectral image.

$$\begin{bmatrix} \hat{a}_{1,1} & \hat{a}_{1,2} & \cdots & \hat{a}_{1,k} \\ \hat{a}_{2,1} & \hat{a}_{2,2} & \cdots & \hat{a}_{2,k} \\ \vdots & \vdots & \ddots & \vdots \\ \hat{a}_{sm,1} & \hat{a}_{sm,2} & \cdots & \hat{a}_{sm,k} \\ \hat{a}_{sm+1,1} & \hat{a}_{sm+1,2} & \cdots & \hat{a}_{sm+1,k} \\ \hat{a}_{sm+2,1} & \hat{a}_{sm+2,2} & \cdots & \hat{a}_{sm+2,k} \\ \vdots & \vdots & \ddots & \vdots \\ \hat{a}_{2sm,1} & \hat{a}_{2sm,2} & \cdots & \hat{a}_{2sm,k} \\ \vdots & \vdots & \cdots & \vdots \\ \hat{a}_{sm(sn-1)+1,1} & \hat{a}_{sm(sn-1)+1,2} & \cdots & \hat{a}_{sm(sn-1)+1,k} \\ \hat{a}_{sm(sn-1)+2,1} & \hat{a}_{sm(sn-1)+2,2} & \cdots & \hat{a}_{sm(sn-1)+2,k} \\ \vdots & \vdots & \ddots & \vdots \\ \hat{a}_{s^2mn,1} & \hat{a}_{s^2mn,2} & \cdots & \hat{a}_{s^2mn,k} \end{bmatrix} \Rightarrow$$

Eq. 22

-continued $$\begin{bmatrix} \hat{a}_{1,2} & \hat{a}_{sm+1,2} & \cdots & \hat{a}_{sm(sn-1)+1,2} \\ \hat{a}_{2,2} & \hat{a}_{sm+2,2} & \cdots & \hat{a}_{sm(sn-1)+2,2} \\ \vdots & \vdots & \ddots & \vdots \\ \hat{a}_{sm,2} & \hat{a}_{2sm,2} & \cdots & \hat{a}_{s^2mn,2} \end{bmatrix}$$

$$\begin{bmatrix} \hat{a}_{1,3} & \hat{a}_{sm+1,3} & \cdots & \hat{a}_{sm(sn-1)+1,3} \\ \hat{a}_{2,3} & \hat{a}_{sm+2,3} & \cdots & \hat{a}_{sm(sn-1)+2,3} \\ \vdots & \vdots & \ddots & \vdots \\ \hat{a}_{sm,3} & \hat{a}_{2sm,3} & \cdots & \hat{a}_{s^2mn,3} \end{bmatrix}$$

$$\vdots$$

$$\begin{bmatrix} \hat{a}_{1,k} & \hat{a}_{sm+1,k} & \cdots & \hat{a}_{sm(sn-1)+1,k} \\ \hat{a}_{2,k} & \hat{a}_{sm+2,k} & \cdots & \hat{a}_{sm(sn-1)+2,k} \\ \vdots & \vdots & \ddots & \vdots \\ \hat{a}_{sm,k} & \hat{a}_{2sm,k} & \cdots & \hat{a}_{s^2mn,k} \end{bmatrix}$$

The operation 216 as illustrated includes interpolating MS image (MSI) bands (back) to an interval (e.g., can be the same interval as in the operation 201, such as [0, 1]). This can be accomplished by performing operations discussed with regard to operation 201.

The method 200 can include displaying the image using a display, performing image analysis on the MS image with the increased resolution, and/or taking some action based on the image analysis.

In summary, let MGS or CGS be applied to a matrix (e.g., image data) A and resulting in matrices Q and R. Applying HPS to the same matrix, A, with a square matrix of zeros on top of the matrix yields a matrix that includes a matrix (−E) on top of Q, where Q is mathematically equivalent to the Q generated using MGS or CGS (to a certain number of significant digits, where the number of significant digits increase the fewer the number of bands there are in the MS image) and with numerical stability maintained regardless of the dimension of the matrix A. −E is negative of the off-diagonal elements of the upper-triangular matrix R, which is also mathematically equivalent to R generated using MGS or CGS (to a certain number of significant digits, where the number of significant digits increase the fewer the number of bands there are in the MS image). Householder QR generates a vector D that is the negative of the diagonal terms in R. Combining the E with the diagonalization of D yields the same matrix R that is generated using MGS or CGS (to a certain number of significant digits, where the number of significant digits increase the fewer the number of bands there are in the MS image). Thus, the Householder QR decomposition can be used in a process to PAN sharpen imagery with a large number of bands. (e.g., superspectral (>10 bands) or hyperspectral (>100 bands) imagery), which is an improvement over G-S PS.

Figure 3:
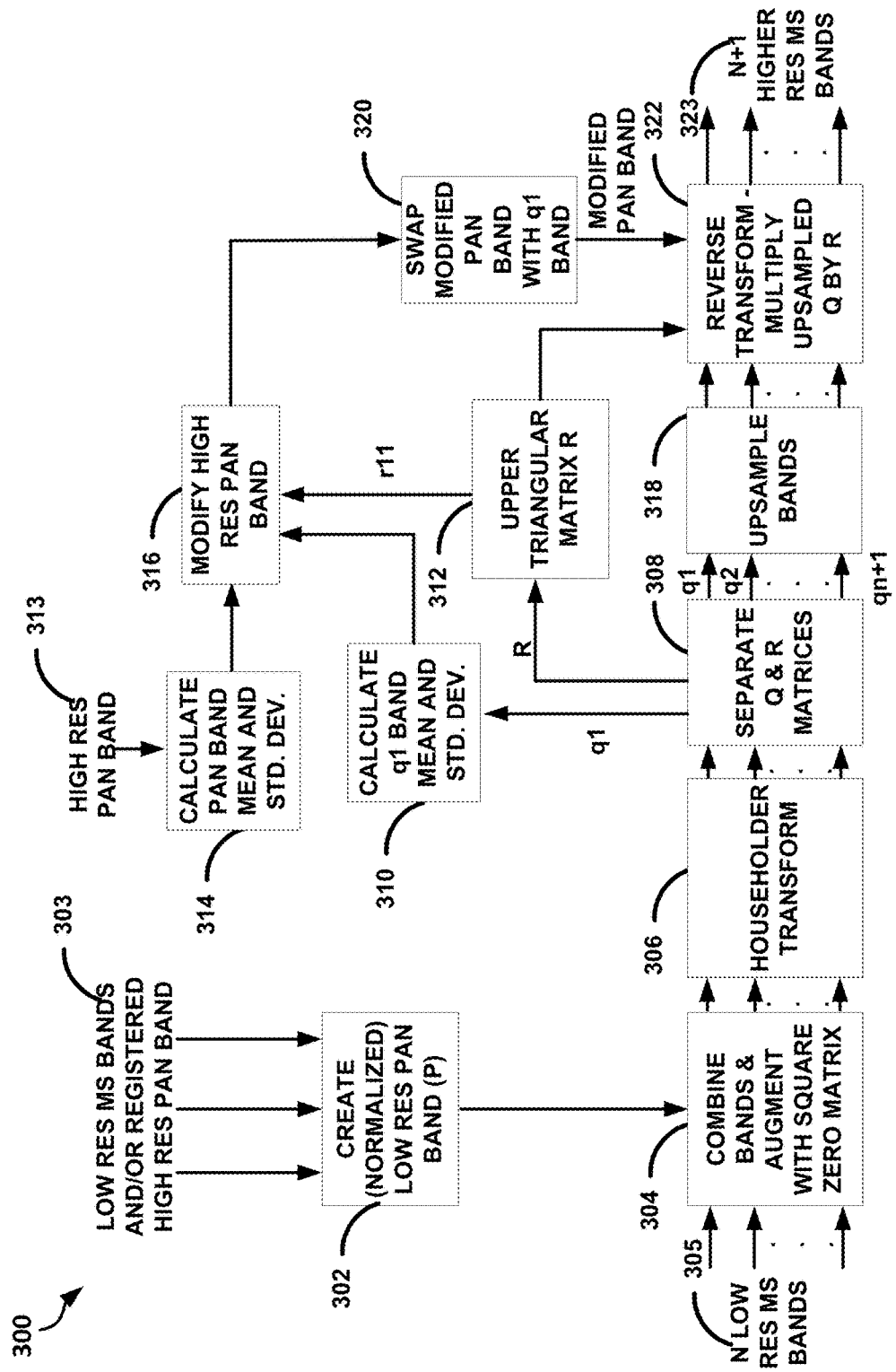
FIG. 3 illustrates, by way of example, a logical block diagram of an embodiment of a system for Householder PAN sharpening, in accord with one or more embodiments.

FIG. 3 illustrates, by way of example, an embodiment of a system 300 for performing HPS. The system 300 includes a low resolution PAN band processor 302 that either (1) receives low resolution MS bands data and creates low resolution PAN band data based on the low resolution MS bands data (e.g., created using a weighted combination of corresponding pixel values of each MS band), (2) receives registered high resolution PAN band data and down samples the high resolution data to reduce the resolution to that of the low resolution MS bands, such as the same resolution as N low resolution MS bands 305, or (3) receives a PAN image of the same geo-location as depicted in the MS bands 305 with a same resolution as the MS bands 305. The processor 302 creates PAN image data with the same resolution as then low resolution MS bands 305. Note that low resolution in this context means a lower spatial resolution than that of the PAN image data. The processor 302 can perform one or more of the operations 202 and/or 201.

The system 300 includes a combine bands and augment with square zero matrix processor 304 communicatively coupled to the processor 302. The processor 304 receives both the low resolution PAN band data from the processor 302 and the N low resolution MS bands 305 and combines the bands into a single matrix and augments the combined matrix with a square zero matrix. The processor 304 can perform the operation 204.

The system 300 includes a Householder transform processor 306 communicatively coupled to the processor 304. The processor 306 receives the matrix from the processor 304 and performs a Householder transform on the received matrix to create a transformed matrix. The processor 306 can perform the operation 206.

The system 300 as illustrated includes a separation processor 308 communicatively coupled to the processor 306. The separation processor 308 receives the transformed matrix from the processor 306 and extracts the Q and R matrices from the transformed matrix. The processor 308 can perform the operation 208.

The system 300 as illustrated includes a mean and standard deviation calculation processor 310 communicatively coupled to the processor 308. The processor 310 receives the Q matrix from the processor 308 and calculates a mean and standard deviation of the first row of the separated Q matrix. The processor 310 can perform the operation 210.

The system as illustrated includes an upper triangular matrix R processor 312 communicatively coupled to the processor 308. The processor 312 extracts a diagonal element of R that is related to the first row of Q from the matrix R. The system 300 as illustrated includes another mean and standard deviation calculation processor 314. The processor 314 receives high resolution PAN band data that is registered to the same geo-location as the geo-location depicted in the low resolution MS bands 305 and determines a mean and standard deviation of the high resolution PAN band data 313. The system 300 as illustrated includes a modified high resolution PAN band data processor 316 communicatively coupled to the modules 310, 312, and 314. The processor 316 receives the mean and standard deviation from and calculated by the processor 310, the diagonal element of R related to Q ($r_{11}$) from and calculated by the processor 312, and high resolution PAN band data and the calculated mean and standard deviation from the processor 314. The processor 316 modifies the received high resolution PAN band data based on the received means, standard deviations, and the diagonal element of R related to Q. In one or more embodiments, the processor 316 divides each element of the PAN image by the value of $r_{11}$. The processor adjusts the statistics of the of the PAN image pixels to match that of column $q_1$ of the orthogonal matrix Q. The processors 310, 312, 314, and 316 in combination can perform the operation 210.

The system 300 as illustrated includes an upsampling processor 318 communicatively coupled to the processor 308. The processor 318 receives the Q matrix from the processor 308 and upsamples the Q matrix (e.g., columns $q_2$ through $q_k$ of Q) to create upsampled Q data. The processor can perform at least a portion of the operation 212. The system 300 as illustrated includes a swap modified PAN band with a first of the Q matrix processor 320 communicatively coupled to the processor 316. The processor 320 swaps the first row of the Q matrix with the modified high resolution PAN band data from the processor 316 to create a modified Q matrix. The processors 320 and 318 can, in combination, perform the operation 212.

The system 300 as illustrated includes a reverse transform processor 322 communicatively coupled to the processors 312, 318, and 320. The reverse transform processor 322 receives the upper triangular matrix R from the processor 312 and the modified Q matrix from the processors 320 and 318 and multiplies them together to perform a reverse transform and create N+1 higher resolution MS bands 323. The processor 322 can perform the operation 214. The resolution of the MS bands 323 is higher than the resolution of the bands 305 and is generally the same resolution as the PAN band data 313. The system 300 can further include a rescaling processor to scale PAN and MS data into the range [0, 1], such as to perform operation 216.

Figure 4B:
FIG. 4B illustrates a PAN image of the same geo-location as depicted in the MS image of FIG. 4A.
Figure 4C:
FIG. 4C illustrates the MS image of FIG. 4A after sharpening the image using one or more embodiments discussed herein.
Figure 4A:
FIG. 4A illustrates an MS image.

FIG. 4A illustrates an MS image 400A. Data representing the MS image is provided to the processor 304 and/or 302, such as is shown in FIG. 3. FIG. 4B illustrates a PAN image 400B of the same geo-location as depicted in the MS image 400A. Data representing the PAN image data is provided to the processor 302 and/or 314, such as is shown in FIG. 3. FIG. 4C illustrates an MS image 400B that is the MS image 400A sharpened using one or more embodiments discussed herein. As can be seen, the image 400C is clearer than the image 400A. This clarity, or lack thereof, is magnified when the view of the image is magnified.

Certain embodiments are described herein as including logic or a number of processors (e.g., electrical or electronic components, such as resistors, capacitors, transistors, inductors, regulators, boosters. Boolean or state logic, diodes, or the like, such as can be incorporated into an integrated circuit (IC)), modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor, such as a processor previously discussed) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information). Processors are examples of modules.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product. e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 5:
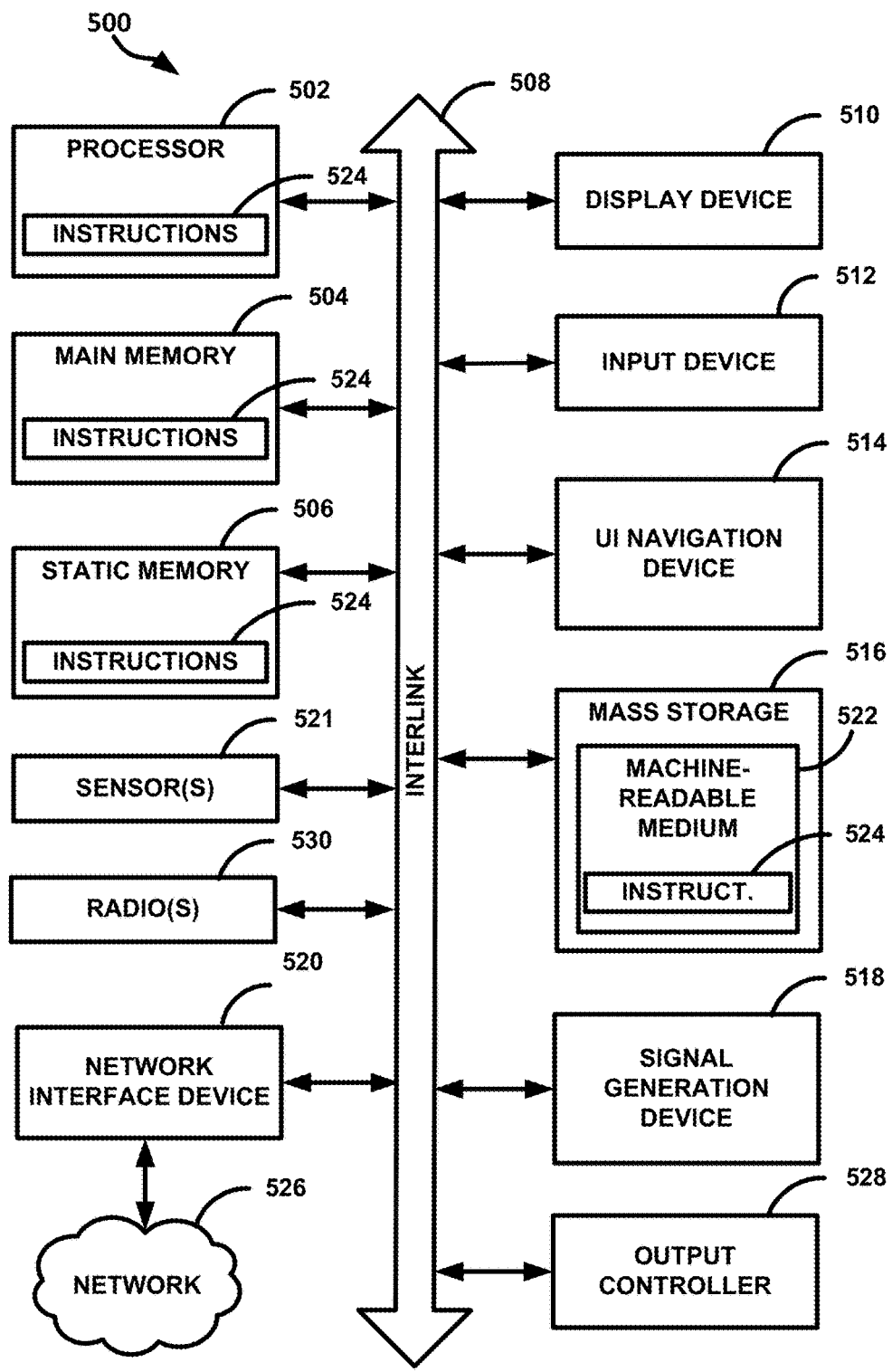
FIG. 5 illustrates, by way of example, a logical block diagram of an embodiment of a machine within which instructions, for causing the machine to perform any one or more of the methodologies discussed herein, may be executed, in accord with one or more embodiments.

FIG. 5 illustrates, by way of example, a block diagram of an embodiment of a machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The processor 502 can be implemented using processing circuitry, such as can include one or more electrical or electronic components, such as one or more resistors, transistors, inductors, capacitors, voltage or current regulators, power supplies, amplifiers, diodes, rectifiers, multiplexers. Boolean logic gates (e.g., AND, OR, or the like), oscillators, or the like. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, WWAN, WLAN, and NFC, permitting the application of security controls on such protocols.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments disclosed herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks. Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 includes a non-transitory machine-readable medium including instructions stored thereon which, when executed by processing circuitry, configure the processing circuitry to perform operations to sharpen a multi-spectral (MS) image using data from a panchromatic (PAN) image, the operations to combine PAN image data with first MS image data to create a combined matrix of image data, append a square zero matrix to the combined matrix to create an appended matrix, transform the appended matrix by performing Householder QR orthogonalization on the appended matrix to create a transformed matrix, separate a first matrix, Q, and determine a second matrix, R, based on the transformed matrix, modify PAN image data so that modified PAN image data includes a mean and standard deviation that is about equal to a mean and standard deviation of data in a first row of the first matrix, upsample at least a portion of the first matrix to create an upsampled Q matrix data, replace the first row of the upsampled Q matrix data with the modified PAN image data to create a modified Q matrix, transform the modified Q matrix by multiplying the modified Q matrix by the determined second matrix to create second MS image data, the first MS image data including a resolution less than a resolution of the second MS image data, and provide signals that cause a display to provide a view of the second MS image data.

In Example 2, Example 1 can include instructions stored thereon which, when executed by a machine, configure the machine to perform operations further to create the PAN image with about a same resolution as a resolution of the MS image by downsampling PAN image data or determining the PAN image data from the MS image data.

In Example 3, at least one of Examples 1-2 can include, wherein the instructions to combine PAN image data with MS image data to create a combined matrix of image data includes instructions to convert the PAN image data and MS image data to vectors that, when combined, form the combined matrix.

In Example 4, at least one of Examples 1-3 can include, wherein the instructions to transform the appended matrix by performing Householder QR orthogonalization on the appended matrix to create a transformed matrix include instructions to perform Householder QR factorization on the appended matrix to yield a third matrix, –E, the matrix Q, and a residual matrix, D, and wherein the instructions to determine a second matrix, R, based on the transformed matrix include instructions to determine R=identity matrix+ E−diagonal (D), where diagonal (D) is each of the elements in the diagonal of the residual matrix.

In Example 5, at least one of Examples 1-4 can include, wherein the instructions to modify PAN image data so that modified PAN image data includes a mean and standard deviation that is about equal to a mean and standard deviation of an intensity basis vector of Q includes modifying each pixel in the PAN image in accord with new_pixel_value=old_pixel_value*(standard deviation of the intensity basis vector/standard deviation of the PAN image data)+mean of intensity basis vector−(standard deviation of the intensity basis vector/standard deviation of the PAN image data)*mean of PAN image data.

In Example 6, at least one of Examples 1-5 can include, wherein the instructions to upsample at least a portion of Q to create an upsampled Q matrix data with a resolution at about a same resolution as a resolution of the PAN image data includes instructions to organize each column vector of Q, besides the intensity basis vector, to respective multi-dimensional matrices, interpolate data into each of the multi-dimensional matrices so that each multi-dimensional matrix of the multi-dimensional matrices includes a same number of rows and columns as there are lines and samples in the PAN image, and re-organize each of the multi-dimensional matrices with interpolated data points into another matrix that includes one less column than Q.

In Example 7, at least one of Examples 1-6 can include, wherein the instructions to replace the first column of the upsampled Q matrix data with the modified PAN image data to create a modified Q matrix include instructions to insert the modified PAN image data into the Q matrix as a column, and transform the modified Q matrix by multiplying the modified Q matrix by the determined R to create MS band image data with a resolution that is about the same as the resolution of the PAN band image data.

In Example 8, at least one of Examples 1-7 can include instructions stored thereon which, when executed by a machine, configure the machine to perform operations further to re-scale data of the MS image to interval [0, 1] prior to creating the PAN image.

In Example 9, at least one of Examples 1-8 can include instructions stored thereon which, when executed by a machine, configure the machine to re-scale data pf the PAN band image to interval [0, 1] prior to creating the PAN band image data.

In Example 10, at least one of Examples 1-9 can include instructions stored thereon which, when executed by a machine, configure the machine to re-scale the MS band image data to interval [0, 1].

In Example 11, at least one of Examples 1-10 can include instructions stored thereon which, when executed by a machine, configure the machine to cause the MS band image data to be displayed on a display communicatively coupled to the machine.

Example 12 includes a computer-implemented method to sharpen a multi-spectral (MS) image using data from a panchromatic (PAN) image, the method comprising combining PAN image data with first MS image data to create a combined matrix of image data, appending a square zero matrix to the combined matrix to create an appended matrix, transforming the appended matrix by performing Householder QR orthogonalization on the appended matrix to create a transformed matrix, separating a first matrix, Q, and determine a second matrix, R, based on the transformed matrix, modifying the PAN image data so that modified PAN image data includes a mean and standard deviation that is about equal to a mean and standard deviation of data in a first row of Q, upsampling at least a portion of Q to create an upsampled Q matrix data, replacing the first row of the upsampled Q matrix data with the modified PAN image data to create a modified Q matrix, transforming the modified Q matrix by multiplying the modified Q matrix by the determined R to create second MS band image data, the first MS band image data including a resolution that is less than a resolution of the second MS band image data, and displaying the second MS band image data.

In Example 13, Example 12 can include creating the PAN image with about a same resolution as a resolution of the MS image by downsampling PAN image data or determining the PAN image data from the first MS image data.

In Example 14, at least one of Examples 12-13 can include, wherein combining PAN image data with first MS image data to create a combined matrix of image data includes converting the PAN image data and first MS image data to vectors that, when combined, form the combined matrix.

In Example 15, at least one of Examples 12-14 can include, wherein transforming the appended matrix by performing Householder QR orthogonalization on the appended matrix to create a transformed matrix includes performing Householder QR factorization on the appended matrix to yield a third matrix, −E, the matrix Q, and a residual matrix, D, and determining a second matrix, R, based on the transformed matrix includes determining R=identity matrix+E−diagonal (D), where diagonal (D) is each of the elements in the diagonal of the residual matrix.

Example 16 includes a system for sharpening a multi-spectral (MS) image using data from a panchromatic (PAN) image, the system comprising one or more processors, one or more memories coupled to the one or more processors, the memory including instructions stored thereon that, when executed by the one or more processors, cause the one or more processors to: combine PAN image data with first MS image data to create a combined matrix of image data and append a square zero matrix to the combined matrix to create an appended matrix, transform the appended matrix by performing Householder QR orthogonalization on the appended matrix to create a transformed matrix, separate a first matrix, Q. and determine a second matrix. R, based on the transformed matrix, modify PAN image data so that modified PAN image data includes a mean and standard deviation that is about equal to a mean and standard deviation of data in a first row of Q, upsample at least a portion of Q to create an upsampled Q matrix data, replace the first row of the upsampled Q matrix data with the modified PAN image data to create a modified Q matrix, and transform the modified Q matrix by multiplying the modified Q matrix by the determined R to create second MS band image data, the first MS band image data including a resolution that is less than a resolution of the second MS band image data, and a display coupled to the one or more processors to provide a view of the second MS band image data.

In Example 17, Example 16 can include, wherein modification of the PAN image data so that modified PAN image data includes a mean and standard deviation that is about equal to a mean and standard deviation of an intensity basis vector of Q includes modification of each pixel in the PAN image in accord with new_pixel_value=old_pixel_value* (standard deviation of the intensity basis vector/standard deviation of the PAN image data)+mean of intensity basis vector−(standard deviation of the intensity basis vector/ standard deviation of the PAN image data)*mean of PAN image data.

In Example 18, at least one of Examples 16-17 can include, wherein upsampling at least a portion of Q to create an upsampled Q matrix data with a resolution at about a same resolution as a resolution of the PAN image data includes organize each column vector of Q, besides the intensity basis vector, to respective multi-dimensional matrices, interpolate data into each of the multi-dimensional matrices so that each multi-dimensional matrix of the multi-dimensional matrices includes a same number of rows and columns as there are lines and samples in the PAN image, and re-organize each of the multi-dimensional matrices with interpolated data points into another matrix that includes one less column than Q.

In Example 19, at least one of Examples 16-18 can include, wherein replacement of the first column of the upsampled Q matrix data with the modified PAN image data to create a modified Q matrix includes insert the modified PAN image data into the Q matrix as a column, and transform the modified Q matrix by multiplying the modified Q matrix by the determined R to create first MS image data with a resolution that is about the same as a resolution of the PAN band image data.

In Example 20, at least one of Examples 16-19 can include, wherein the instructions further include instructions that, when executed by the one or more processors, configure the one or more processors to re-scale data of the first MS image data to interval [0, 1] prior to creating the PAN image.

In Example 21, at least one of Examples 16-20 can include, wherein the instructions further include instructions that, when executed by the one or more processors, configure the one or more processors re-scale data pf the PAN band image to interval [0, 1] prior to creating the PAN band image data.

Although an embodiment has been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable medium including instructions stored thereon which, when executed by processing circuitry, configure the processing circuitry to perform operations to sharpen a multi-spectral (MS) image using data from a panchromatic (PAN) image, the operations to:
   combine PAN image data with first MS image data to create a combined matrix of image data;
   append a square zero matrix to the combined matrix to create an appended matrix;
   transform the appended matrix by performing Householder QR orthogonalization on the appended matrix to create a transformed matrix;
   separate a first matrix, Q, and determine a second matrix, R, based on the transformed matrix;
   modify PAN image data so that modified PAN image data includes a mean and standard deviation that is about equal to a mean and standard deviation of data in a first row of the first matrix;
   upsample at least a portion of the first matrix to create an upsampled Q matrix data;
   replace the first row of the upsampled Q matrix data with the modified PAN image data to create a modified Q matrix;
   transform the modified Q matrix by multiplying the modified Q matrix by the determined second matrix to create second MS image data, the first MS image data including a resolution less than a resolution of the second MS image data; and
   provide signals that cause a display to provide a view of the second MS image data.

2. The non-transitory machine-readable medium of claim 1 further including instructions stored thereon which, when executed by a machine, configure the machine to perform operations further to:
create the PAN image with about a same resolution as a resolution of the MS image by downsampling PAN image data or determining the PAN image data from the MS image data.

3. The non-transitory machine-readable medium of claim 1, wherein the instructions to combine PAN image data with MS image data to create a combined matrix of image data includes instructions to convert the PAN image data and MS image data to vectors that, when combined, form the combined matrix.

4. The non-transitory machine-readable medium of claim 1, wherein:
the instructions to transform the appended matrix by performing Householder QR orthogonalization on the appended matrix to create a transformed matrix include instructions to perform Householder QR factorization on the appended matrix to yield a third matrix, −E, the matrix Q, and a residual matrix, D; and
wherein the instructions to determine a second matrix, R, based on the transformed matrix include instructions to determine R=identity matrix+E−diagonal(D), where diagonal(D) is each of the elements in the diagonal of the residual matrix.

5. The non-transitory machine-readable medium of claim 1, wherein the instructions to modify PAN image data so that modified PAN image data includes a mean and standard deviation that is about equal to a mean and standard deviation of an intensity basis vector of Q includes modifying each pixel in the PAN image in accord with:

new_pixel_value=old_pixel_value*(standard deviation of the intensity basis vector/standard deviation of the PAN image data)+mean of intensity basis vector−(standard deviation of the intensity basis vector/standard deviation of the PAN image data)*mean of PAN image data.

6. The non-transitory machine-readable medium of claim 1, wherein the instructions to upsample at least a portion of Q to create an upsampled Q matrix data with a resolution at about a same resolution as a resolution of the PAN image data includes instructions to:
organize each column vector of Q, besides the intensity basis vector, to respective multi-dimensional matrices;
interpolate data into each of the multi-dimensional matrices so that each multi-dimensional matrix of the multi-dimensional matrices includes a same number of rows and columns as there are lines and samples in the PAN image; and
re-organize each of the multi-dimensional matrices with interpolated data points into another matrix that includes one less column than Q.

7. The non-transitory machine-readable medium of claim 1, wherein the instructions to replace the first column of the upsampled Q matrix data with the modified PAN image data to create a modified Q matrix include instructions to insert the modified PAN image data into the Q matrix as a column; and
transform the modified Q matrix by multiplying the modified Q matrix by the determined R to create MS band image data with a resolution that is about the same as the resolution of the PAN band image data.

8. The non-transitory machine-readable medium of claim 1 further including instructions stored thereon which, when executed by a machine, configure the machine to perform operations further to re-scale data of the MS image to interval [0, 1] prior to creating the PAN image.

9. The non-transitory machine-readable medium of claim 1 further including instructions stored thereon which, when executed by a machine, configure the machine to re-scale data of the PAN band image to interval [0, I] prior to creating the PAN band image data.

10. The non-transitory machine-readable medium of claim 1 further including instructions stored thereon which, when executed by a machine, configure the machine to re-scale the MS band image data to interval [0, 1].

11. The non-transitory machine-readable medium of claim 1 further including instructions stored thereon which, when executed by a machine, configure the machine to cause the MS band image data to be displayed on a display communicatively coupled to the machine.

12. A computer-implemented method to sharpen a multi-spectral (MS) image using data from a panchromatic (PAN) image, the method comprising:
combining PAN image data with first MS image data to create a combined matrix of image data;
appending a square zero matrix to the combined matrix to create an appended matrix;
transforming the appended matrix by performing Householder QR orthogonalization on the appended matrix to create a transformed matrix;
separating a first matrix, Q, and determine a second matrix, R, based on the transformed matrix;
modifying the PAN image data so that modified PAN image data includes a mean and standard deviation that is about equal to a mean and standard deviation of data in a first row of Q;
upsampling at least a portion of Q to create an upsampled Q matrix data;
replacing the first row of the upsampled Q matrix data with the modified PAN image data to create a modified Q matrix;
transforming the modified Q matrix by multiplying the modified Q matrix by the determined R to create second MS band image data, the first MS band image data including a resolution that is less than a resolution of the second MS band image data; and
displaying the second MS band image data.

13. The method of claim 12, further comprising:
creating the PAN image with about a same resolution as a resolution of the MS image by downsampling PAN image data or determining the PAN image data from the first MS image data.

14. The method of claim 12, wherein combining PAN image data with first MS image data to create a combined matrix of image data includes converting the PAN image data and first MS image data to vectors that, when combined, form the combined matrix.

15. The method of claim 12, wherein:
transforming the appended matrix by performing Householder QR orthogonalization on the appended matrix to create a transformed matrix includes performing Householder QR factorization on the appended matrix to yield a third matrix, −E, the matrix Q, and a residual matrix, D; and
determining a second matrix, R, based on the transformed matrix includes determining R=identity matrix+E−diagonal(D), where diagonal(D) is each of the elements in the diagonal of the residual matrix.

16. A system for sharpening a multi-spectral (MS) image using data from a panchromatic (PAN) image, the system comprising:

one or more processors;

one or more memories coupled to the one or more processors, the memory including instructions stored thereon that, when executed by the one or more processors, cause the one or more processors to:

combine PAN image data with first MS image data to create a combined matrix of image data and append a square zero matrix to the combined matrix to create an appended matrix;

transform the appended matrix by performing Householder QR orthogonalization on the appended matrix to create a transformed matrix;

separate a first matrix, Q, and determine a second matrix, R, based on the transformed matrix;

modify PAN image data so that modified PAN image data includes a mean and standard deviation that is about equal to a mean and standard deviation of data in a first row of Q;

upsample at least a portion of Q to create an upsampled Q matrix data;

replace the first row of the upsampled Q matrix data with the modified PAN image data to create a modified Q matrix; and transform the modified Q matrix by multiplying the modified Q matrix by the determined R to create second MS band image data, the first MS band image data including a resolution that is less than a resolution of the second MS band image data; and a display coupled to the one or more processors to provide a view of the second MS band image data.

17. The system of claim 16, wherein modification of the PAN image data so that modified PAN image data includes a mean and standard deviation that is about equal to a mean and standard deviation of an intensity basis vector of Q includes modification of each pixel in the PAN image in accord with:

new_pixel_value=old_pixel_value*(standard deviation of the intensity basis vector/standard deviation of the PAN image data)+mean of intensity basis vector−(standard deviation of the intensity basis vector/standard deviation of the PAN image data)*mean of PAN image data.

18. The system of claim 16, wherein upsampling at least a portion of Q to create an upsampled Q matrix data with a resolution at about a same resolution as a resolution of the PAN image data includes:

organize each column vector of Q, besides the intensity basis vector, to respective multi-dimensional matrices;

interpolate data into each of the multi-dimensional matrices so that each multi-dimensional matrix of the multi-dimensional matrices includes a same number of rows and columns as there are lines and samples in the PAN image; and re-organize each of the multi-dimensional matrices with interpolated data points into another matrix that includes one less column than Q.

19. The system of claim 16, wherein replacement of the first column of the upsampled Q matrix data with the modified PAN image data to create a modified Q matrix includes insert the modified PAN image data into the Q matrix as a column; and transform the modified Q matrix by multiplying the modified Q matrix by the determined R to create first MS image data with a resolution that is about the same as a resolution of the PAN band image data.

20. The system of claim 16 wherein the instructions further include instructions that, when executed by the one or more processors, configure the one or more processors to re-scale data of the first MS image data to interval [0, 1] prior to creating the PAN image.

* * * * *